United States Patent
Meynen et al.

(10) Patent No.: US 12,517,377 B2
(45) Date of Patent: Jan. 6, 2026

(54) ELECTROCHROMIC LENS COMPRISING A WAFER HAVING A PERIMETER SHOULDER

(71) Applicant: Essilor International, Charenton-le-Pont (FR)

(72) Inventors: Mathieu Meynen, Charenton le Pont (FR); Sira Uhalte Nogues, Charenton-le-Pont (FR); Marc Reignault, Charenton le Pont (FR); Sunil Bhangale, Singapore (SG)

(73) Assignee: Essilor International, Charenton-le-Pont (FR)

( * ) Notice: Subject to any disclaimer, the term of this patent is extended or adjusted under 35 U.S.C. 154(b) by 432 days.

(21) Appl. No.: 17/999,513

(22) PCT Filed: Jun. 8, 2021

(86) PCT No.: PCT/EP2021/065369
§ 371 (c)(1),
(2) Date: Nov. 21, 2022

(87) PCT Pub. No.: WO2021/250047
PCT Pub. Date: Dec. 16, 2021

(65) Prior Publication Data
US 2023/0324718 A1    Oct. 12, 2023

(30) Foreign Application Priority Data

Jun. 9, 2020  (EP) .................................... 20305613

(51) Int. Cl.
G02C 1/00    (2006.01)
G02C 7/02    (2006.01)
G02C 7/08    (2006.01)

(52) U.S. Cl.
CPC .............. *G02C 7/083* (2013.01); *G02C 1/10* (2013.01); *G02C 7/024* (2013.01)

(58) Field of Classification Search
CPC .... G02C 7/083; G02C 7/024; G02C 2202/16; G02C 7/101; G02C 9/00; G02C 1/10;
(Continued)

(56) References Cited

U.S. PATENT DOCUMENTS

| 6,010,220 A | 1/2000 | Smarto |
| 6,079,827 A * | 6/2000 | Coleman ................... B24B 9/14 351/159.73 |

(Continued)

FOREIGN PATENT DOCUMENTS

| EP | 2 236 244 A1 | 10/2010 | |
| EP | 3474063 A1 * | 4/2019 | ............. G02C 7/083 |

(Continued)

OTHER PUBLICATIONS

International Search Report issued Dec. 9, 2021 in PCT/EP2021/065369 filed on Jun. 8, 2021, 6 pages.

*Primary Examiner* — William R Alexander
*Assistant Examiner* — Matthew Y Lee
(74) *Attorney, Agent, or Firm* — Oblon, McClelland, Maier & Neustadt, L.L.P.

(57) ABSTRACT

An optical system, an eyewear device, and a method of manufacturing the optical system, the optical system comprises a wafer and an optical element. The wafer and the optical element are bonded to each other by an adhesive material, and the wafer has a perimeter shoulder.

17 Claims, 6 Drawing Sheets

(58) Field of Classification Search
CPC .............. G02C 11/10; B29D 11/00009; B29D 11/00942; B29D 11/00817
See application file for complete search history.

(56) References Cited

U.S. PATENT DOCUMENTS

| | | | |
|---|---|---|---|
| 6,214,261 B1 * | 4/2001 | Smarto | ................... B29C 70/76 |
| | | | 156/107 |
| 6,292,955 B1 | 9/2001 | Anton | |
| 6,786,596 B1 | 9/2004 | Ayoub | |
| 2012/0013846 A1 | 1/2012 | Dürsteler López et al. | |
| 2018/0354212 A1 * | 12/2018 | Padiou | ................... B24B 13/065 |
| 2019/0324294 A1 * | 10/2019 | Kamibeppu | .............. G02C 1/10 |
| 2020/0331219 A1 * | 10/2020 | Van Heugten | ... B29D 11/00817 |
| 2020/0409174 A1 * | 12/2020 | Taguchi | ................. G02C 7/024 |
| 2021/0191158 A1 | 6/2021 | Biver et al. | |
| 2022/0050307 A1 * | 2/2022 | Luderich | .......... B29D 11/00009 |
| 2022/0057657 A1 * | 2/2022 | Blum | ..................... G02C 7/101 |

FOREIGN PATENT DOCUMENTS

| | | | | |
|---|---|---|---|---|
| FR | 2 828 564 A1 | | 2/2003 | |
| JP | 2994870 B2 | | 12/1999 | |
| JP | 2015-219488 A | | 12/2015 | |
| WO | WO-2019175360 A1 * | | 9/2019 | ....... B29D 11/00009 |
| WO | WO 2019/189562 A1 | | 10/2019 | |

* cited by examiner

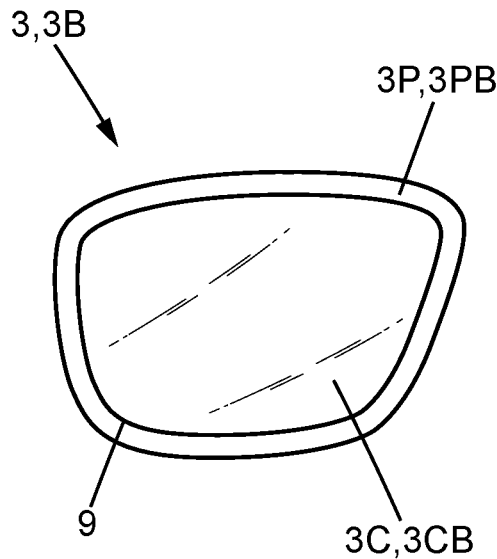
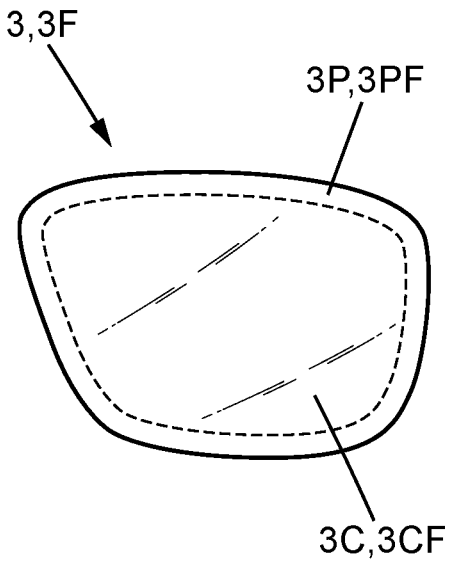
FIG. 2A  FIG. 2B
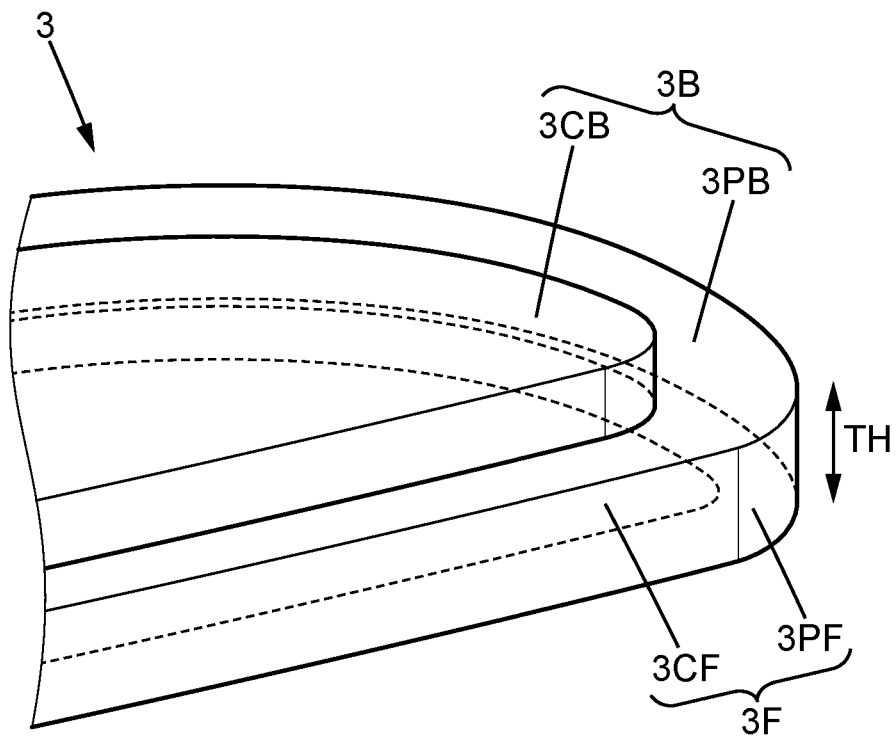
FIG. 2C

ELECTROCHROMIC LENS COMPRISING A WAFER HAVING A PERIMETER SHOULDER

FIELD OF INVENTION

The invention relates to the field of optical systems, and more particularly optical systems comprising a wafer adapted to an ophthalmic prescription and an electrochromic cell.

Such optical systems are also known as "electrochromic lenses" in the field of ophthalmic lenses.

BACKGROUND OF THE INVENTION

Ophthalmic lenses help correct vision disorders or refractive errors, also called ametropia, such as myopia, hyperopia, astigmatism and presbyopia. An ophthalmic lens is manufactured on the basis of a wearer's ophthalmic prescription. The prescription includes different information such as the sphere value, the cylinder value, the prism and the addition power.

However, even if ophthalmic lenses are manufactured so as to be adapted to different situations for the wearer, in particular progressive lenses making it possible to correct both near vision and far vision, there is a demand for smart glasses having a greater adaptability.

For this purpose, the ophthalmic lens industry has developed electro-active lenses, i.e. lenses of which certain properties can be modified electronically. These changes can be controlled by the wearer or by a healthcare professional, typically an ophthalmologist. These changes can also be automatic, in which case the electro-active lens may comprise sensors configured to measure certain parameters of the environment, for example the light intensity or the wavelength of the light rays.

In particular, among electro-active lenses, there are electrochromic lenses capable of changing the light transmission value and of tinting.

Typically an electrochromic lens is thus an optical system comprising a wafer manufactured based on prescription data and an electrochromic cell allowing the electrochromic lens thus formed to adapt to the brightness or to light intensity. Part of the prescription can also be provided by the electrochromic cell.

An electrochromic cell typically has a structure comprising two flat transparent outer layers, for example two surfaces made of organic or mineral material, on which transparent electrically conductive coatings are deposited on the inner faces thereof. An electrochromic composition fills a cavity formed between the two electrically conductive coatings. It is thus possible to vary the light transmission value of the cell by applying an electric field between the electrically conductive coatings.

The wafer and the electrochromic cell are therefore bonded or glued together in order to manufacture the electrochromic lens, and the latter must be adapted to be mounted in a spectacle frame. Furthermore, once the electrochromic lens is housed in the frame of the glasses, and more exactly in the bezel or recess, the electrochromic lens has to remain intact in the event of possible shocks.

More generally, the assembly of a wafer and an optical element, whether the latter is an electrochromic cell or an optical light-guide, is complicated. Moreover, there is a risk of water or dust infiltration between the wafer and the optical element.

The present invention seeks to improve the situation.

SUMMARY OF THE INVENTION

The present invention concerns an optical system comprising:
  a wafer, and
  an optical element.
The wafer and optical element are bonded to each other by an adhesive material. The wafer has a perimeter shoulder.

According to an embodiment, the perimeter shoulder defines a perimeter section and a central section of the wafer, the perimeter section having an average thickness lower than an average thickness of the central section.

Advantageously, the average thickness of the perimeter section is greater than an average thickness of the adhesive material between the wafer and the optical element.

Typically, the perimeter section and the central section each comprise a front surface, respectively called perimeter front surface and central front surface, facing the optical element. The perimeter front surface and the central front surface form together a front surface of the wafer.

According to an embodiment, the adhesive material is provided only on the perimeter front surface.

Advantageously, a radius of curvature of a portion of the front surface of the wafer is substantially equal to a radius of curvature of a corresponding facing portion of a surface of the optical element.

For example, the front surface of the wafer is spherical and the back surface of the optical element is also spherical with an identical curvature. This makes it possible to have a front surface of the wafer which is independent of the shape of the frame or of the prescription, while maintaining a minimum distance between the front surface of the wafer and the corresponding surface of the optical element. It is thus advantageous to manufacture stocks of wafers with a spherical front surface. It is then enough to position the optical center of the wafer correctly relative to the frame and make the perimeter shoulder with a grinder.

Typically, the perimeter section and the central section each comprise a back surface, respectively called perimeter back surface and central back surface, the perimeter back surface and the central back surface being respectively opposite the perimeter front surface and the central front surface. The perimeter back surface and the central back surface form together a back surface of the wafer.

According to an embodiment, part of the perimeter shoulder has an angular shape, the perimeter back surface locally forming an angle with the central back surface.

According to an embodiment, part of the perimeter shoulder has the shape of a bevel, the perimeter back surface being an oblique surface joining an edge of the perimeter back surface to the central back surface.

According to an embodiment, part of the perimeter shoulder has a curved shape, the perimeter back surface being tangent to the central back surface in the vicinity of the central back surface.

For instance, the adhesive material comprises glue and/or rubber.

Advantageously, the optical system further comprises a spacer within the adhesive material in order to maintain an air gap between the wafer and the optical element.

According to an embodiment, the wafer comprises a back surface designed and surfaced according to a wearer's ophthalmic prescription and a front surface opposite the back surface and intended to be bonded to the optical element.

According to an embodiment, the optical element comprises an electrochromic cell.

According to an embodiment, the optical element comprises an optical light-guide.

According to an embodiment, the perimeter shoulder is covered by an opaque coating.

Such an embodiment is particularly advantageous when the optical element is an electrochromic cell. In an example, the electrochromic cell indeed comprises two shells respectively supporting a metal strip to electrically connect the electrochromic cell to a processor. The shells, which are transparent outer layers, are bonded together with a bead of glue. A metal strip or the bead of glue may be visible due to the transparency of the wafer or the optical element. Therefore, the opaque coating helps covering the exterior whitish appearance of the optical system.

The opaque coating is for instance made of a polyurethane epoxy material deposited on the perimeter shoulder by using a coating applicator so that little or no opaque coating flows onto the central front surface of the wafer and the optical element.

The present invention also concerns an eyewear device comprising:
- at least one optical system as previously described, and
- a frame including at least one rim housing at least partially the at least one optical system, the rim being connected to at least one temple.

An inner edge of the at least one rim is a groove having a shape complementary to the perimeter shoulder of the at least one optical system, the adhesive material of the at least one optical system being thus concealed within the inner edge.

Finally, the present invention concerns a method of manufacturing the above-mentioned optical system. The method comprises the following acts:
- receiving a wearer's ophthalmic prescription,
- designing and then manufacturing a wafer based on the wearer's ophthalmic prescription,
- machining the wafer to form a perimeter shoulder on a periphery of the wafer, and
- bonding the wafer and an optical element using an adhesive material.

Typically, the perimeter shoulder defines a perimeter section and a central section of the wafer, the perimeter section having an average thickness lower than an average thickness of the central section. According to an embodiment, the method further comprises, before manufacturing the wafer, the following acts:
- calculating a desired minimal average thickness of the perimeter section based on the wearer's ophthalmic prescription,
- predicting, using a design of the wafer obtained after designing, a future average thickness of the perimeter section after machining the wafer, and
- if the predicted future average thickness of the perimeter section is lower than the desired minimal average thickness, generating a new design of the wafer so that a new future average thickness of the perimeter section determined by prediction is greater than the desired minimal average thickness.

Advantageously, generating a new design of the wafer is iteratively performed until the predicted future average thickness of the perimeter section is equal to the desired minimal average thickness.

BRIEF DESCRIPTION OF THE DRAWINGS

Other features and advantages of the invention will become apparent from the following description provided for indicative and non-limiting purposes, with reference to the accompanying drawings, wherein:

FIG. 2A illustrates a view of the back surface of a wafer of the optical system of FIG. 1;

FIG. 2B illustrates a view of the front surface of the wafer of the optical system of FIG. 1;

FIG. 2C illustrates a transparent perspective view of the wafer of FIG. 1;

DETAILED DISCLOSURE

Figure 1:
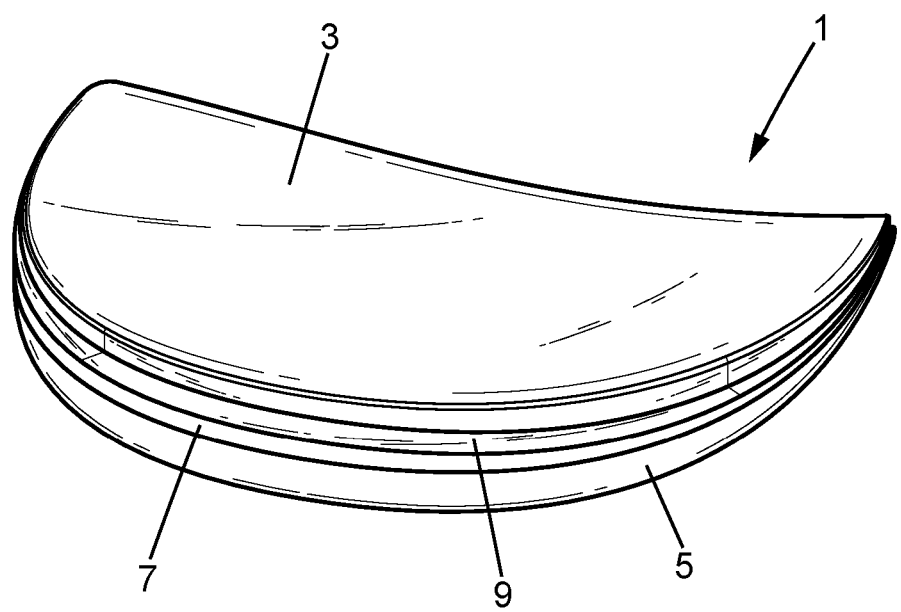
FIG. 1 illustrates an optical system according to the invention.

FIG. 1 illustrates an optical system 1.

As detailed hereinafter, the optical system 1 is advantageously an electrochromic ophthalmic lens intended to be mounted in a spectacle frame.

The optical system comprises a wafer 3 and an optical element 5. The wafer 3 and the optical element 5 are bonded to each other by an adhesive material 7.

The wafer 3 will be described below in more detail in reference to FIGS. 2A-2C.

The wafer 3 is adapted to give ophthalmic properties to the optical system 1. Typically, the wafer 3 is designed and manufactured so as to satisfy a wearer's ophthalmic prescription.

The wearer's ophthalmic prescription is a set of data, called prescription data hereinafter, determined by a healthcare professional, for instance an ophthalmologist. The prescription data includes different information related to the wearer such as the sphere value, the cylinder value, the prism and, if relevant, the addition power. Such prescription data are necessary to design and manufacture an ophthalmic lens intended to be worn by the wearer in order to correct vision disorders or refractive errors, also called ametropia. For instance, when the wearer suffers from presbyopia, the prescription data include an addition power to manufacture progressive ophthalmic lenses adapted to this ametropia.

The wafer 3 is preferably made of transparent material.

As illustrated in FIG. 2C, the wafer 3 comprises a back surface 3B and a front surface 3F opposed to the back surface 3B.

As previously explained, the optical system 1 is advantageously an electrochromic ophthalmic lens intended to be mounted in a spectacle frame.

In such a case, the back surface 3B corresponds to the surface closest to the wearer's eye when the wearer wears the spectacle frame. In other words, the back surface 3B is the surface of the wafer 3 positioned on the side of the wearer's eye.

Conversely, the front surface 3F corresponds to the furthest surface from the wearer's eye when the wearer wears the spectacle frame. Moreover, as illustrated in FIG. 1, the front surface 3F is also adapted to be bonded to the optical element 5 using the adhesive material 7.

As mentioned above, the wafer 3 is generally manufactured to satisfy an ophthalmic prescription. It is well known to the skilled person that, in order to reduce the complexity of the manufacture of the wafer 3, semi-finished lenses, also called lens blanks, are manufactured upstream. A semi-finished lens is a lens of which only one of the surfaces is already finished and machined. In general, the finished lens of the semi-finished lens is the front surface. The semi-finished lenses are then stored. When an ophthalmic prescription is received, the most suited semi-finished lens to satisfy the ophthalmic prescription acquired is selected and it is then sufficient to machine the back surface. The back surface is therefore specific to the wearer and is machined according to the prescription data.

Consequently, it can be considered in the present invention that the front surface 3F corresponds to the pre-machined surface of the semi-finished lens used to manufacture the wafer 3, whereas the back surface 3B corresponds to the back surface of the semi-finished lens after machining based on the prescription data.

Conversely, the prescription may be provided by the front surface 3F and not the back surface 3B of the wafer 3.

Furthermore, in the context of the present invention, the wafer 3 has a perimeter shoulder 9.

As illustrated in FIG. 2A, illustrating the back surface 3B of the wafer 3, the perimeter shoulder 9 is provided on the back surface 3B of the wafer. The perimeter shoulder 9 is therefore visible when the wafer is seen from the back surface 3B. It is understood here that FIG. 2A illustrates the back surface 3B of the wafer 3 alone, therefore before mounting in the spectacle frame, so that the perimeter shoulder 9 on the back surface 3B of the wafer is clearly visible.

Conversely, FIG. 2B illustrates the front surface 3F of the wafer 3 and the perimeter shoulder 9 is not visible since the latter is provided only on the back surface 3B. In FIG. 2B, the perimeter shoulder 9 is therefore only represented by a broken line while it is shown in solid line in FIG. 2A. Once again, FIG. 2A illustrates the front surface 3F of the wafer 3 alone, therefore before mounting in the spectacle frame.

The perimeter shoulder 9 defines a perimeter section 3P and a central section 3C of the wafer 3. The perimeter section 3P has an average thickness lower than an average thickness of the central section 3C. In FIG. 2C, only the thickness TH of the perimeter section 3P is referenced.

As illustrated in FIG. 2A, the perimeter section 3P and the central section 3C each comprise a back surface, respectively called perimeter back surface 3PB and central back surface 3CB, opposed to the optical element 5.

The perimeter back surface 3PB and the central back surface 3CB form together the back surface 3B of the wafer 3.

As illustrated in FIG. 2B, the perimeter section 3P and the central section 3C each comprise a front surface, respectively called perimeter front surface 3PF and central front surface 3CF, facing the optical element 5.

The perimeter front surface 3PF and the central front surface 3CF form together the front surface 3F of the wafer 3.

As explained above, the front surface 3F of the wafer 3 is adapted to be bonded to the optical element 5 using the adhesive material 7. Consequently, since the front surface 3 is formed by the combination of the perimeter front surface 3PF and the central front surface 3CF defined by the perimeter shoulder 9, the perimeter front surface 3PF and/or the central front surface 3CF are adapted to be bonded to the optical element 5 using the adhesive material 7.

Advantageously, the adhesive material 7 is applied only on the perimeter front surface 3PF. In such a case, the adhesive material 7 is applied on a close loop along the perimeter front surface 3PF, so as to provide sealing properties and avoid dust or water penetrating in the air gap.

According to an embodiment, part of the perimeter shoulder 9 has an angular shape, the perimeter back surface 3PB locally forming an angle with the central back surface 3CB. In the example illustrated in FIG. 2C, the perimeter back surface 3PB and the central back surface 3CB locally form a right angle.

Alternatively or in parallel, part of the perimeter shoulder 9 has the shape of a bevel. The perimeter back surface 3PB is an oblique surface joining an edge of the perimeter back surface 3PB to the central back surface 3CB.

Alternatively or in parallel, part of the perimeter shoulder 9 has a curved shape, the perimeter back surface 3PB being tangent to the central back surface 3CB in the vicinity of the central back surface 3CB.

The optical element 5 is adapted to give optical properties to the optical system 1 in addition to the ophthalmic properties provided by the wafer 3. Furthermore, the optical element 5 can also be adapted to provide part of the wearer's ophthalmic prescription so that the combination of the wafer 3 and the optical element 5 satisfy to the wearer's ophthalmic prescription.

Typically, the optical element 5 comprises a first surface and a second surface (not referenced in the figures).

The first surface of the optical element 5 is adapted to be bonded to the wafer 3 using the adhesive material 7. More specifically, the first surface is adapted to be bonded to the front surface 3F of the wafer 3 and, advantageously, only to the perimeter front surface 3PF.

In other words, the first surface corresponds to the surface, among the first and second surfaces of the optical element 5, closest to the wearer's eye when the wearer wears the spectacle frame.

Conversely, the second surface opposed to the first surface corresponds to the furthest surface from the wearer's eye when the wearer wears the spectacle frame.

According to a preferred embodiment, the optical element 5 comprises an electrochromic cell. In such an embodiment, the optical system 1 is, as previously mentioned, an electrochromic ophthalmic lens.

Electrochromic ophthalmic lenses can be classified as electro-active lenses, i.e. lenses of which certain properties can be electronically modified. In particular, the light transmission value of an electrochromic ophthalmic lens can electronically vary.

For instance, the electrochromic ophthalmic lens is controlled by the wearer or by a healthcare professional, typically an ophthalmologist. Alternatively, the light transmission value can also be automatically modified.

In the embodiment in which the optical element 5 is an electrochromic cell, the latter has for instance a structure comprising two flat transparent outer layers, for example two surfaces made of organic or mineral material, on which transparent electrically conductive coatings are deposited on the inner faces thereof. An electrochromic composition fills a cavity formed between the two electrically conductive coatings. It is thus possible to vary the light transmission value of the cell by applying an electric field between the electrically conductive coatings.

The periphery can be delimited at the periphery by a seal formed from a crosslinked adhesive material, the seal being suitable for supporting the two assembled transparent layers.

Figure 2D:
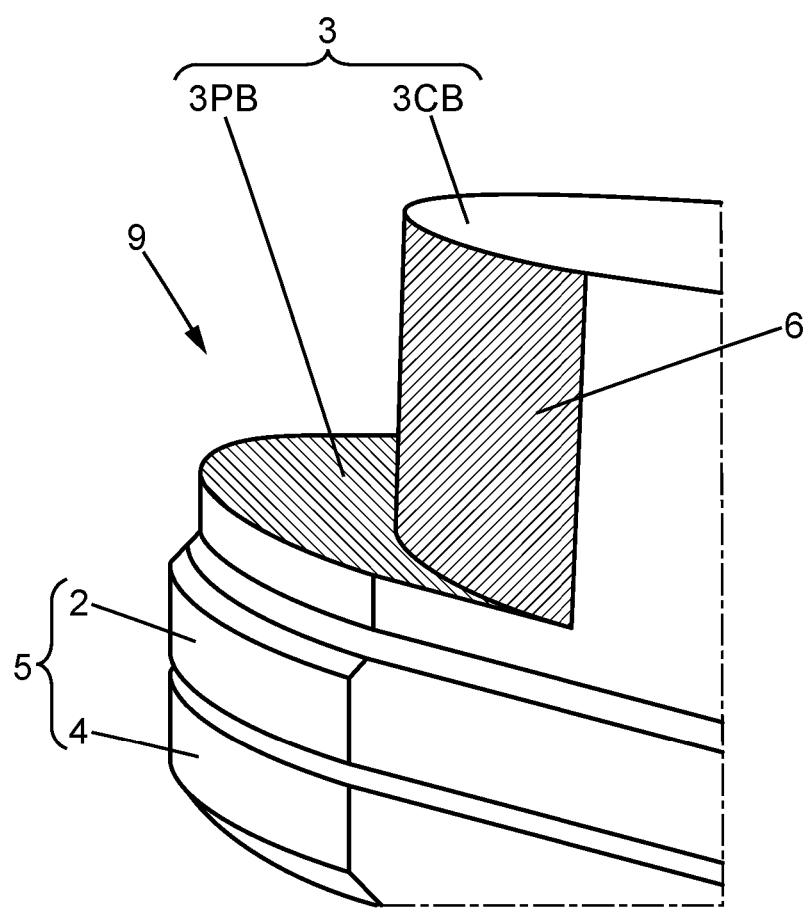
FIG. 2D illustrates a partial and perspective view of the edge of the optical system of FIG. 1, in which a perimeter shoulder of the wafer is covered by an opaque coating.

An embodiment in which the optical element 5 is an electrochromic cell is illustrated in FIG. 2D. As previously explained, the optical element 5 comprises a first transparent outer layer 2 and a second transparent outer layer 4. In the literature, the two transparent outer layers 2, 4 are typically mineral shells bonded together with a bead of glue. In another example, the layers 2, 4 may be plastic shells.

Since the optical element 5 is an electrochromic cell that must be controlled electronically, both shells support a silver bus on the edge. A silver bus takes the form of a metal strip to electrically connect the electrochromic cell to a processor.

However, a silver bus or the bead of glue may be visible due to the transparency of the wafer 3 or the optical element 5. Therefore, in the embodiment shown in FIG. 2D, the perimeter shoulder 9 is covered by an opaque coating 6. The opaque coating 6 is shown as a black coating on the perimeter shoulder 9 in FIG. 2D. According to an embodiment, the opaque coating 6 only covers the perimeter back surface 3PB of the wafer 3. The opaque coating 6 helps covering the exterior whitish appearance of the optical system 1. Preferably, in order not to obstruct the view of the wearer, the opaque coating 6 does not cover the central back surface 3CB of the wafer 3.

Typically, the opaque coating 6 is made of a polyurethane epoxy material (known by the acronym EPU).

According to an embodiment, the optical element 5 may comprise an optical light-guide. Typically, in such a case, the first and second surfaces of the optical element 5 are plane surfaces.

When the optical element 5 comprises an optical light-guide, the ophthalmic prescription can be reached by the combination of the wafer 3 and the optical element 5, since an optical light-guide is a perfect plano-optical and plano-geometrical element. The optical element 5 may further have a non-zero optical power. In this case, the radius of curvature of the back surface 3B of the wafer 3 may compensate the non-zero optical power of the optical element 5.

As explained above and illustrated in FIG. 3 showing a zoomed-in and partial transparent view of the edge of the optical system 1, the wafer 3 and the optical element 5 are bonded to each other by the adhesive material 7. The adhesive material 7 is visible in transparency and represented by a solid form.

Figure 3:
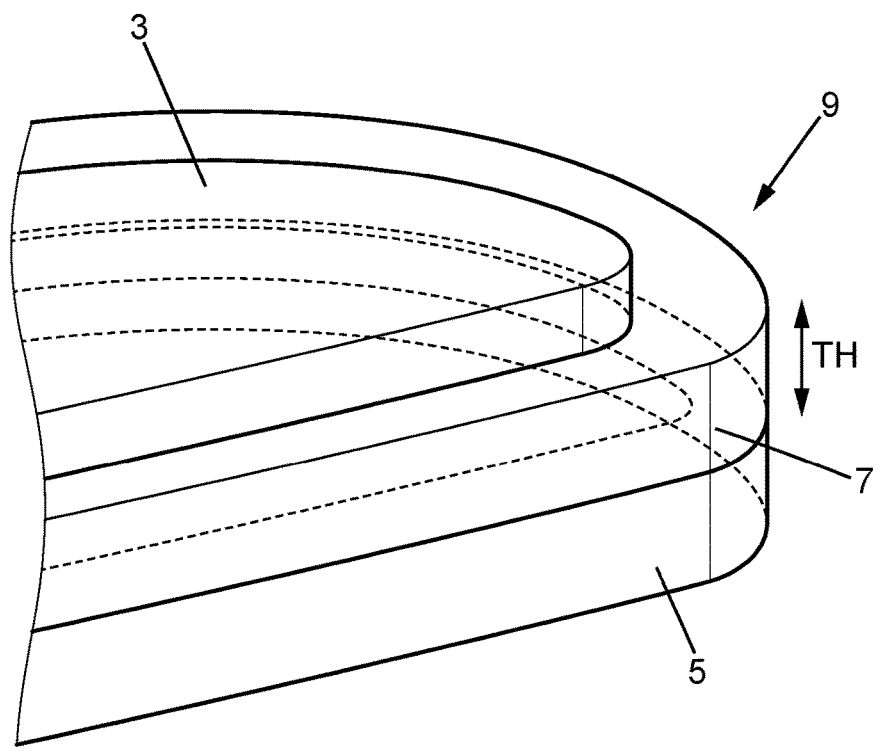
FIG. 3 illustrates a zoomed-in and partial transparent view of the edge of the optical system of FIG. 1.

More particularly, in the embodiment illustrated in FIG. 3, the adhesive material 7 is provided only on the perimeter front surface 3PF of the wafer 3. Consequently, the adhesive material 7 is only in contact with a perimeter portion of the optical element 5 facing the perimeter front surface 3PF.

The presence of the adhesive material 7 at the periphery of the optical system 1, and more exactly on the perimeter front surface 3PF, makes it possible to prevent the infiltration of dust and water between the wafer 3 and the optical element 5. The thickness of the adhesive material 7 also makes it possible to have an air gap between the wafer 3 and the optical element 5.

Moreover, in order to maintain an air gap between the wafer 3 and the optical element 5, one or more spacers can be provided within the adhesive material 7. A spacer has for example a rod shape or an "X" shape making it possible to guarantee that the distance between the wafer 3 and the optical element 5 remains greater than a minimum distance.

However, advantageously, an average thickness of the adhesive material 7 must still be lower than the average thickness TH of the perimeter section 3P.

The adhesive material 7 may comprise glue. In addition, or alternatively, the adhesive material 7 may comprise rubber.

As previously specified, the optical system 1 is intended to be mounted in a spectacle frame. When the optical element 5 is an electrochromic cell, the optical system 1 resulting from the combination of the wafer 3 and the optical element 5 is an electrochromic ophthalmic lens. In such a preferred embodiment, an eyewear device corresponding to a spectacle frame in which the electrochromic ophthalmic lens is mounted is adapted for electronically varying the light transmission value based on the ambient light, the light intensity or the wavelength of the light rays.

Figure 4:
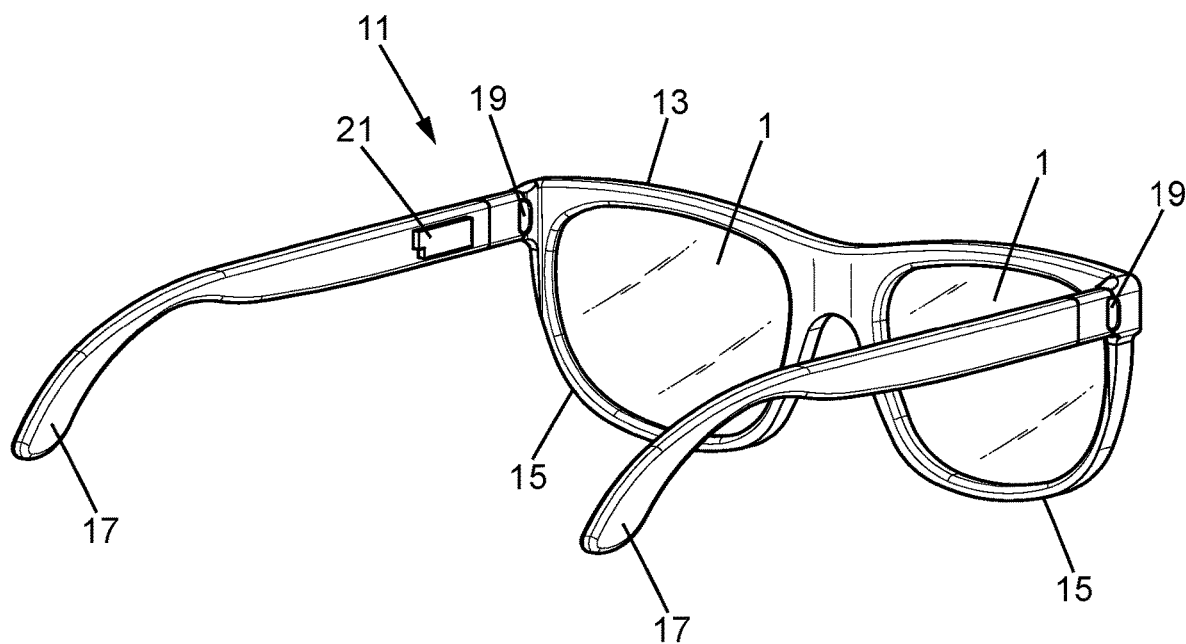
FIG. 4 illustrates an eyewear device comprising an optical system according to the invention.

Referring now to FIG. 4, an eyewear device 11 according to the present invention will now be described.

The eyewear device 11 is adapted to correct vision disorders or refractive errors, also called ametropia, of the wearer. Typically, the wearer suffers from myopia, hyperopia, astigmatism or presbyopia. The ophthalmic lenses mounted in the eyewear device 11 are designed and manufactured based on the wearer's prescription data.

As illustrated in FIG. 4, the eyewear device 11 comprises a frame 13 and at least one optical system 1 such as that described above and illustrated in FIG. 1.

The frame 13, or spectacle frame, is adapted to be worn by a wearer, and advantageously the wearer to whom the prescription data used to manufacture the optical system 1 are relative.

The frame 13 includes at least one rim 15, at least one temple 17, at least one hinge 19 and a processor 21.

The rim 15 is configured to house at least partially the optical system 1. Typically, the rim 15 includes a holder configured to house and retain an upper portion of the optical system 1 and a cradle configured to at least partially encircle a lower portion of the optical system 1.

As previously detailed, the optical system 1 comprises a wafer 3 and an optical element 5, the wafer 3 and the optical element 5 being bonded to each other by an adhesive material 7. In addition, in the context of the invention, the wafer 3 has a perimeter shoulder 9.

Consequently, an inner edge of the rim 15 is a groove having a shape complementary to the perimeter shoulder 9 of the optical system 1. The adhesive material 7 provided between the wafer 3 and the optical element 5, and more particularly between the front surface 3F of the wafer 3 and the first surface of the optical element 5, is thus concealed within the inner edge of the rim 15.

The complementary shape of the groove of the rim 15 both hides the layer of adhesive material 7 and securely holds the optical system 1.

In the example illustrated in FIG. 4, the frame 13 comprises two rims 15, each one housing at least partially an optical system 1.

Similarly, the frame 13 illustrated in FIG. 4 includes two temples 17.

Each temple 17 is connected by a hinge 19 to an end of a rim 15. More exactly, a temple 17 is connected to an end of a rim 15, while the other temple 17 is connected to an end of the other rim 15.

The temples 17 are configured to be placed on the ears of the wearer in order to ensure the stability of the eyewear device 11 when the eyewear device 11 is worn by the wearer. The hinges 19 make it possible to unfold the temples 17 when the wearer wishes to wear the eyewear device 11 and to fold the temples 17 when the wearer removes the eyewear device 11.

Finally, the processor 21 is configured to electronically control the optical system 1 and modify certain properties thereof. In particular, when the optical system 1 comprises an electrochromic cell, the processor 21 is configured to modify the light transmission value. The processor 21 thus makes it possible to adapt the eyewear device 11 to ambient light.

To this end, the eyewear device 11 may comprise sensors arranged to measure certain parameters of the environment, for example the light intensity or the wavelength of the light rays. The measurements of the sensors are then used to modify the light transmission value and adapt it to the ambient light.

It is known to the person skilled in the art that the sensors can be placed in several places on the frame 13. For instance, the sensors can be arranged on an outer side of the frame 13 to measure the intensity of the light incident on the ophthalmic lenses. The sensors can also be located on an inner side of the frame 13 to measure the intensity of the light transmitted by the ophthalmic lenses. A sensor can also be a camera directed towards the wearer's eye in order to determine in real-time the light intensity received by the wearer's eye as a function of the pupil size.

The measurements can be directly transmitted to the processor 21. Then, the processor 21 determines a light transmission value adapted to the ambient light using a computer program stored in a memory. Alternatively, the measurements can be transmitted to a remote device, for instance a medical device, to allow the wearer or a healthcare professional to determine the appropriate light transmission value. This value is then transmitted to the processor 21 to control the optical system 1 accordingly.

A system and a method of manufacturing the above-described optical system 1 will now be described respectively with reference to FIG. 5 and FIG. 6.

Figure 5:
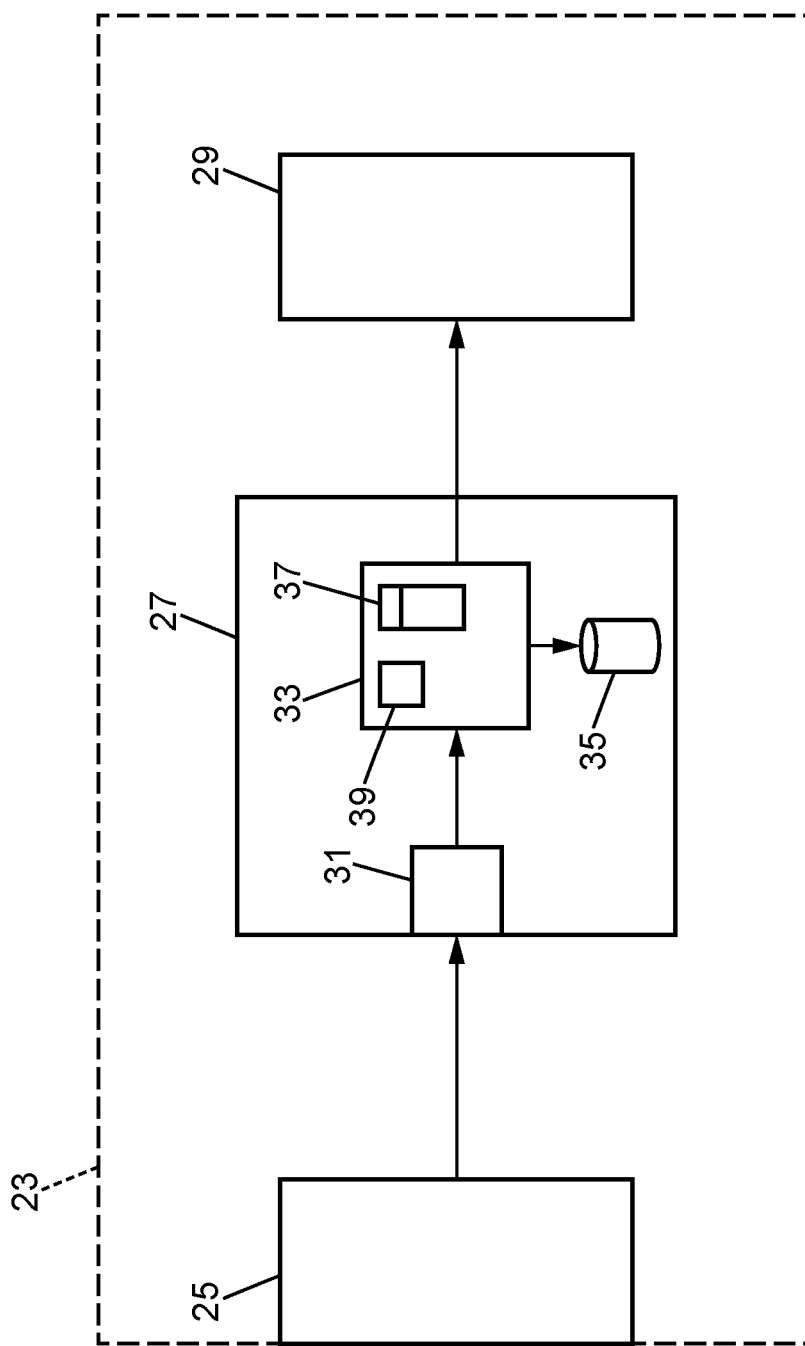
FIG. 5 illustrates a system of manufacturing an optical system according to the invention.

A system 23 is illustrated in FIG. 5.

The system 23 is adapted to manufacture the optical system 1 based on wearer's prescription data.

The system 23 comprises an ordering side 25, a design side 27 and a manufacturing side 29.

The ordering side 29 is adapted to generate an ophthalmic prescription to correct vision disorders or refractive errors of an individual. The ophthalmic prescription is established by a healthcare professional, typically an ophthalmologist, for the purpose of manufacturing an eyewear device adapted to the individual.

The ophthalmic prescription is a set of prescription data calculated for instance at the ordering side 29 level based on measurements performed during an eye examination or a vision test of the individual. The prescription data include different information related to the individual such as the sphere value, the cylinder value, the prism and, if relevant, the addition power.

Once the prescription data are generated, the ordering side 29 transmits the ophthalmic prescription to the design side 27.

Figure 6:
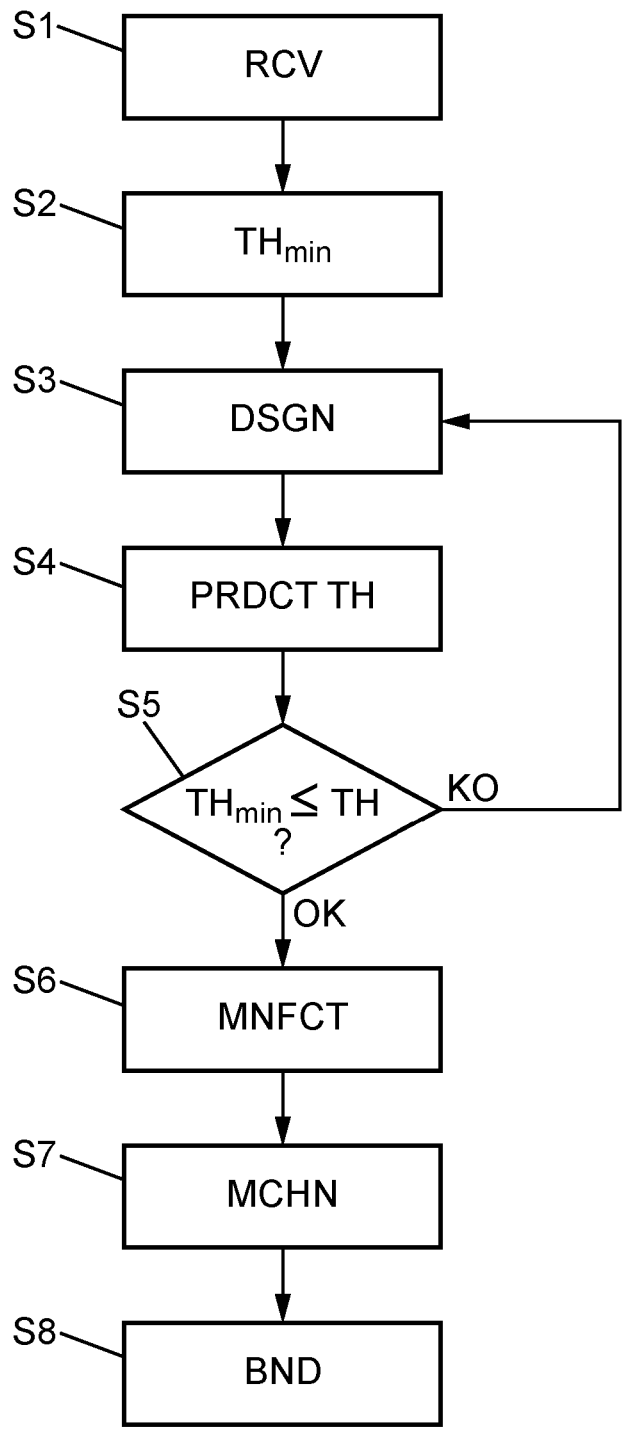
FIG. 6 illustrates a method of manufacturing an optical system according to the invention.

Consequently, in a step S1 of the method illustrated in FIG. 6, the design side 27 receives a wearer's ophthalmic prescription.

The design side 27 is adapted to generate a design of the wafer 3 of the optical system 1 based on the received wearer's ophthalmic prescription.

As illustrated in FIG. 5, the lens design unit 27 comprises a communication module 31, a calculation unit 33 and a database 35.

The communication module 31 is adapted to communicate with the ordering side 25. More particularly, as previously explained, the communication module 31 is adapted to receive the ophthalmic prescription generated and emitted by the ordering side 25.

Furthermore, the communication module 31 is also adapted to communicate with the manufacturing side 29 of the system 23.

As detailed above, the optical system 1 of the present invention comprises a wafer 3 and an optical element 5. The wafer 3 and the optical element 5 are bonded to each other by an adhesive material 7.

Here, the calculation unit 33 is thus adapted to design the wafer 3 of the optical system 1.

Moreover, in the context of the present invention, the wafer 3 of the optical system 1 has a perimeter shoulder 9. The perimeter shoulder 9 defines a perimeter section 3P and a central section 3C of the wafer 3, the average thickness TH of the perimeter section 3P being lower than the average thickness of the central section 3C.

Consequently, according to an embodiment, the calculation unit 33 can also be adapted to calculate a desired minimal average thickness $TH_{min}$ of the perimeter section 3P of the wafer 3 based on the wearer's ophthalmic prescription received by the communication module 31.

Thus, in a step S2 of the method, the calculation unit 33 calculates the desired minimal average thickness $TH_{min}$ of the perimeter section 3P based on the wearer's ophthalmic prescription.

Typically, the desired minimal average thickness $TH_{min}$ of the perimeter section 3P is about 0.4 mm.

However, the desired minimum average thickness $TH_{min}$ may depend on the wearer's prescription data. The adjustment of the minimum average thickness $TH_{min}$ allows better stability of the curvature of the front surface 3F of the wafer 3 and reduces the risk of cracking or crazing.

In a step S3, the calculation unit 33 generates a design of the wafer 3 based on the wearer's ophthalmic prescription received by the communication module 31. Indeed, the wafer 3 is intended to satisfy the received ophthalmic prescription. The step S3 can be performed before, in parallel or after the step S2 of calculating the desired minimal average thickness $TH_{min}$ of the perimeter section 3P.

Regarding more specifically the generation of the design of the wafer 3 performed during step S3, it is well known to the skilled person that, in order to reduce the complexity of the manufacture of the wafer 3, semi-finished lenses, also called lens blanks, are manufactured upstream. A semi-finished lens is a lens of which only one of the surfaces is already finished and machined. In general, the finished lens of the semi-finished lens is the front surface and it is then sufficient to machine the back surface which is therefore specific to the wearer.

In such a case, the calculation unit 33 selects, when the wearer's ophthalmic prescription is received, the most suited semi-finished lens to satisfy the ophthalmic prescription. The available pre-manufactured semi-finished lenses are listed and referenced in a database, for example the database 35, and are thus accessible to the calculation unit 33.

After selecting the most suited semi-finished lens based on the prescription data, the calculation unit 33 calculates a design for the unfinished surface of the semi-finished lens. The calculation unit 33 therefore takes into account prescription data and the semi-finished lens selected to generate the design of the wafer 3. In particular, the design of the unfinished surface is calculated so that the combination of the pre-machined surface and the unfinished surface after surfacing satisfies the ophthalmic prescription.

It can be considered in the present invention that the front surface 3F corresponds to the pre-machined surface of the semi-finished lens used to manufacture the wafer 3, whereas the back surface 3B corresponds to the back surface of the semi-finished lens after machining.

Furthermore, in the context of the present invention, the wafer 3 is intended to be bounded to an optical element 5 after manufacturing and machining. Consequently, according to an embodiment, the design generated by the calculation unit 33 also depends on the optical element 5.

For instance, when the optical element 5 comprises an optical light-guide, the wafer 3 can be designed so that the wearer's prescription data result from the combination of the wafer 3 and optical element 5. In particular, the radius of curvature of the back surface 3B of the wafer 3 may compensate the non-zero optical power of the optical element 5.

In general, whatever the optical element 5, whether it comprises an electrochromic cell or an optical light-guide, it is preferable that a radius of curvature of a portion of the front surface 3F of the wafer 3 is substantially equal to a radius of curvature of a corresponding facing portion of the first surface of the optical element 5. Thus, if the optical element 5 is selected before the generation of the design of the wafer 3, the semi-finished lens is selected by the calculation unit 33 not only as a function of the prescription data but also as a function of the optical element 5 and the radius of curvature of a portion of the first surface of the optical element 5.

For example, the front surface 3F of the wafer 3 is spherical and the back surface of the optical element 5 is also spherical with an identical curvature. This makes it possible to have a front surface 3F of the wafer 3 which is independent of the shape of the frame or of the prescription, while maintaining a minimum distance between the front surface 3F of the wafer 3 and the corresponding surface of the optical element 5. It is thus advantageous to manufacture stocks of wafers with a spherical front surface. It is then enough to position the optical center of the wafer 3 correctly relative to the frame and make the perimeter shoulder 9 with a grinder.

The calculation unit 33 may further be adapted to predict, using the design of the wafer 3, a future average thickness of the perimeter section 3P after machining the wafer 3.

Accordingly, in a step S4 of the method, the calculation unit 33 predicts, using the design of the wafer 3 obtained after the designing step S3, the future average thickness of the perimeter section 3P after machining the wafer 3.

In other words, the calculation unit 33 simulates, using computer means, the manufacturing of the wafer 3 based on the design acquired in step S3. Then, the calculation unit 33 simulates the machining of the wafer 3 in order to predict the future average thickness of the perimeter section 3P.

At the end of step S4, the calculation unit 33 has therefore determined the desired minimal average thickness $TH_{min}$ and the predicted future average thickness of the perimeter section 3P.

The calculation unit 33 may be adapted to compare these two thickness values.

In a step S5, the calculation unit 33 compares the minimum average thickness $TH_{min}$ and the future average thickness of the perimeter section 3P.

If the predicted future average thickness of the perimeter section 3P is lower than the desired minimal average thickness $TH_{min}$, the calculation unit 33 generates a new design of the wafer 3 so that a new future average thickness of the perimeter section 3P determined by prediction is greater than the desired minimal average thickness $TH_{min}$.

In other words and as illustrated in FIG. 6, if the predicted future average thickness of the perimeter section 3P is lower than the desired minimal average thickness $TH_{min}$, steps S3 and S4 are again implemented.

For instance, another semi-finished lens is selected in the database 35. Alternatively or additionally, the calculation unit 33 generates a new design for the unfinished surface of the selected semi-finished lens by using another algorithm. Another possibility is to simulate the machining of the perimeter shoulder 9 in another way so that the future average thickness of the new perimeter section 3P is greater than that of the previous simulation.

In particular, the idea is to locally increase, in the generated design, the thickness of the wafer 3, especially on the edge, so that it is subsequently possible to machine the perimeter shoulder 9 there.

Once the new design of the wafer 3 has been generated and step of predicting the future average thickness of the new perimeter section 3P has been implemented, step S5 is again implemented to determine whether the criterion on the average thickness is verified, i.e. if the predicted future average thickness of the section perimeter 3P is greater than or equal to the desired minimal average thickness $TH_{min}$.

Advantageously, the calculation unit 33 generates a new design of the wafer 3 by successive iterations until the predicted future average thickness of the perimeter section 3P is equal to the desired minimal average thickness $TH_{min}$.

The minimization of the thickness TH of the perimeter section 3P makes it possible to locally reduce the thickness of the wafer 3 and therefore of the optical system 1.

As illustrated in FIG. 5, the calculation unit 33 comprises a memory 37 and a processor 39.

The memory 37 is configured to store various programs required for the calculation unit 33 to operate. In particular, in the context of the invention, the memory 37 is configured to store a computer program which includes instructions whose execution by the processor 39 causes the designing of the wafer 3 to be implemented.

Finally, the database 35 is adapted to store information accessible to the calculation unit 33 and allowing the latter to generate the design of the wafer 3 on the basis of prescription data. For instance, as explained above, the database 35 stores data relating to semi-finished lenses, and more specifically data relating to the characteristics of the pre-machined surface of each semi-finished lens.

The database 35 can be accessible to the calculation unit 33 by one or more inputs. For example, the database 35 returns one or more semi-finished lenses in response to input prescription data. Typically, at least one semi-finished lens corresponds to the association of a sphere value and a cylinder value.

Furthermore, the database 35 can be adapted to store data relating to optical elements such that the optical element 5. As a consequence, the calculation unit 33 can select, before the generation of the design of the design in step S3, the optical element 5 intended to be bonded to the wafer 3 after manufacturing and machining. Indeed, as explained above, the radius of curvature of the front surface 3F or the back surface 3B can depend on the radius of curvature of the first surface or the second surface of the optical element 5.

Following the generation of the design of the wafer 3, the design side 27 transmits the generated design to the manufacturing side 29. The generated design is emitted for instance by the communication module 31.

The manufacturing side 29 is adapted to manufacture an optical system 1 based on the design of the wafer 3 generated and emitted by the communication module 31 of the design side 27.

In a step S6, a wafer 3 is manufactured in the manufacturing side 29 based on the design received from the design side 27 and generated by the calculation unit 33.

More particularly, as explained above, the semi-finished lens selected in the database 35 by the calculation unit 33 is retrieved at the manufacturing side 29. The semi-finished lenses are for instance stored in a physical lens blank storage. The semi-finished lens therefore comprises a pre-machined surface and an unfinished surface intended to be surfaced.

The manufacturing side 29 is adapted to surface the unfinished surface of the semi-finished lens so that the unfinished surface, after machining, corresponds to the generated design for satisfying the wearer's ophthalmic prescription generated in the ordering side 25. Typically, the unfinished surface to be surfaced is the back surface of the semi-finished lens.

The manufacturing side 29 also comprises devices and machine-tools for the operations of blocking, cribbing, surfacing, polishing and all other necessary operations for manufacturing the wafer 3 satisfying the prescription. Starting from the semi-finished lens retrieved from the physical lens blank storage, the needed operations are performed in order to surface the back surface of the semi-finished lens in order to obtain the desired wafer 3 complying with the design transmitted by the design side 27.

Then, in a step S7, the wafer 3 is machined to form the perimeter shoulder 9 on the periphery of the wafer 3.

As previously detailed, the perimeter shoulder 9 may have various shapes.

For instance, part of the perimeter shoulder 9 has an angular shape, the perimeter back surface 3PB locally forming an angle with the central back surface 3CB. Such an embodiment is illustrated in FIG. 2C, wherein the perimeter back surface 3PB and the central back surface 3CB locally form a right angle.

Alternatively or in parallel, part of the perimeter shoulder 9 has the shape of a bevel. The perimeter back surface 3PB is an oblique surface joining an edge of the perimeter back surface 3PB to the central back surface 3CB.

Alternatively or in parallel, part of the perimeter shoulder 9 has a curved shape, the perimeter back surface 3PB being tangent to the central back surface 3CB in the vicinity of the central back surface 3CB.

In addition, according to an embodiment, the average thickness TH of the perimeter section 3P is greater than or equal to the desired minimum average thickness $TH_{min}$ calculated by the calculation unit 33 in step S2. Advantageously, the average thickness TH of the perimeter section 3P is equal to the desired minimum average thickness $TH_{min}$.

Furthermore, at the end of step S7, the perimeter shoulder 9 may be further covered by an opaque coating 6. This embodiment is illustrated in FIG. 2D. The opaque coating 6 is particularly useful when the optical element 5 is an electrochromic cell comprising a first shell 2 and a second shell 4 bonded together by a bead of glue. In this case, the opaque coating 6 makes it possible to mask both the bead of glue and the electrical connections on the edge of the shells 2, 4.

The opaque coating 6 is for example deposited on the perimeter shoulder 9 using a coating applicator whose barrel has been filled with EPU (epoxy polyurethane) coating. The opaque coating 6 is then carefully deposited by using the applicator head over the perimeter shoulder 9 so that little or no opaque coating 6 flows onto the central front surface 3CF of the wafer 3 and the optical element 5. Any excess opaque coating 6 can be removed with blue tape after the opaque coating 6 has cured on the perimeter shoulder 9.

Finally, in a step S8 of the method illustrated in FIG. 6, the wafer 3 and the optical element 5 are bounded to each other using the adhesive material 7. As previously explained, the optical element 5 can be selected by the calculation unit 33 in the database 35. Indeed, the optical element 5 can have ophthalmic properties to be considered for the generation of the design of the wafer 3.

The optical element 5 is added to the wafer 3 in order to provide optical properties to the optical system 1 in addition to the ophthalmic properties provided by the wafer 3.

More particularly, the first surface of the optical element 5 is bonded to the front surface 3F of the wafer 3 using the adhesive material 7. Advantageously, as illustrated in FIG. 3, the first surface of the optical element 5 is bonded to the perimeter front surface 3PF of the wafer 3.

According to a preferred embodiment, the optical element 5 comprises an electrochromic cell. In such an embodiment, the optical system 1 is an electrochromic ophthalmic lens and the light transmission value of the electrochromic ophthalmic lens can electronically vary.

According to an embodiment, the optical element 5 comprises an optical light-guide. In such a case, the first and second surfaces of the optical element 5 are plane surfaces.

As illustrated in FIG. 3, the adhesive material 7 is provided only on the perimeter front surface 3PF of the wafer 3. At the end of step S8, the adhesive material 7 is thus only in contact with a perimeter portion of the optical element 5 facing the perimeter front surface 3PF.

Furthermore, during step S8, one or more spacers can be provided within the adhesive material 7 in order to maintain an air gap between the wafer 3 and the optical element 5.

Advantageously, an average thickness of the adhesive material 7 is lower than the average thickness TH of the perimeter section 3P.

The adhesive material 7 comprises for instance glue and/or rubber.

The present invention has several advantages.

First of all, the perimeter shoulder machined on the wafer allows, after mounting the optical system in the spectacle frame, to conceal the layer of adhesive material and to avoid exposure of this layer. In particular, the groove, whose shape is complementary to the perimeter shoulder, hides the layer of adhesive material and securely holds the optical system in the rim of the spectacle frame.

Furthermore, the application of the adhesive material only at the periphery of the optical system, and more exactly on the perimeter front surface of the wafer, makes it possible to prevent the infiltration of dust and water between the wafer and the optical element. An air gap between the wafer and the optical element can be maintained by one or more spacers arranged within the adhesive material.

Finally, the minimization of the thickness of the perimeter section makes it possible to locally reduce the thickness of the wafer and therefore of the optical system. A calculation of the design of the wafer by successive iterations advantageously makes it possible to minimize the thickness of the perimeter section of the wafer.

The invention claimed is:

1. An optical system comprising:
a wafer; and
an optical element,
said wafer and optical element being bonded to each other by an adhesive material, wherein
the wafer has a perimeter shoulder, the perimeter shoulder defines a perimeter section and a central section of the wafer, said perimeter section having an average thickness lower than an average thickness of the central section, the perimeter section and the central section each comprises a front surface, respectively called perimeter front surface and central front surface, facing the optical element, the perimeter front surface and the central front surface forming together a front surface of the wafer, and the adhesive material is provided only on the perimeter front surface.

2. The optical system of claim 1, wherein the average thickness of the perimeter section is greater than an average thickness of the adhesive material between the wafer and the optical element.

3. The optical system of claim 1, wherein a radius of curvature of a portion of the front surface of the wafer is substantially equal to a radius of curvature of a corresponding facing portion of a surface of the optical element.

4. The optical system of claim 1, wherein the perimeter section and the central section each comprise a back surface, respectively called perimeter back surface and central back surface, the perimeter back surface and the central back surface being respectively opposite the perimeter front surface and the central front surface, the perimeter back surface and the central back surface forming together a back surface of the wafer.

5. The optical system of claim 4, wherein part of the perimeter shoulder has an angular shape, the perimeter back surface locally forming an angle with the central back surface.

6. The optical system of claim 4, wherein part of the perimeter shoulder has a shape of a bevel, the perimeter back surface being an oblique surface joining an edge of the perimeter back surface to the central back surface.

7. The optical system of claim 4, wherein part of the perimeter shoulder has a curved shape, the perimeter back surface being tangent to the central back surface in a vicinity of said central back surface.

8. The optical system of claim 1, wherein the adhesive material comprises glue and/or rubber.

9. The optical system of claim 1, further comprising a spacer within the adhesive material in order to maintain an air gap between the wafer and the optical element.

10. The optical system of claim 1, wherein the wafer comprises a back surface designed and surfaced according to a wearer's ophthalmic prescription and a front surface opposite said back surface and intended to be bonded to the optical element.

11. The optical system of claim 1, wherein the optical element comprises an electrochromic cell.

12. The optical system of claim 1, wherein the optical element comprises an optical light-guide.

13. The optical system of claim 1, wherein the perimeter shoulder is covered by an opaque coating.

14. An eyewear device comprising:
at least one optical system according to claim 1; and
a frame including at least one rim housing at least partially said at least one optical system, said rim being connected to at least one temple by a hinge,
wherein an inner edge of said at least one rim is a groove having a shape complementary to the perimeter shoulder of the at least one optical system, the adhesive material of said at least one optical system being thus concealed within said inner edge.

15. A method of manufacturing an optical system that includes a wafer and an optical element, said wafer and optical element being bonded to each other by an adhesive material, wherein the wafer has a perimeter shoulder,
the perimeter shoulder defines a perimeter section and a central section of the wafer, said perimeter section having an average thickness lower than an average thickness of the central section,
the perimeter section and the central section each comprises a front surface, respectively called perimeter front surface and central front surface, facing the optical element, the perimeter front surface and the central front surface forming together a front surface of the wafer, and
the adhesive material is provided only on the perimeter front surface, the method comprising:
receiving a wearer's ophthalmic prescription;
designing and then manufacturing a wafer based on said wearer's ophthalmic prescription;
machining the wafer to form a perimeter shoulder on a periphery of the wafer; and
bonding the wafer and an optical element using an adhesive material.

16. The method of claim 15,
further comprising, before manufacturing the wafer:
calculating a desired minimal average thickness of the perimeter section based on the wearer's ophthalmic prescription;
predicting, using a design of the wafer obtained after designing, a future average thickness of the perimeter section after machining the wafer; and
comparing the predicted future average thickness and the desired minimal average thickness and, when the predicted future average thickness of the perimeter section is lower than the desired minimal average thickness, generating a new design of the wafer so that a new future average thickness of the perimeter section determined by prediction is greater than the desired minimal average thickness.

17. The method of claim 16, wherein generating a new design of the wafer is iteratively performed until the predicted future average thickness of the perimeter section is equal to the desired minimal average thickness.

* * * * *